United States Patent [19]

Roche et al.

[11] Patent Number: 4,916,697

[45] Date of Patent: Apr. 10, 1990

[54] APPARATUS FOR PARTITIONED CLOCK STOPPING IN RESPONSE TO CLASSIFIED PROCESSOR ERRORS

[75] Inventors: Thomas J. Roche; Gregory S. Still, both of Endwell, N.Y.

[73] Assignee: International Business Machines Corporation, Armonk, N.Y.

[21] Appl. No.: 211,469

[22] Filed: Jun. 24, 1988

[51] Int. Cl.⁴ .............................................. G06F 11/00
[52] U.S. Cl. ................................................... 371/14
[58] Field of Search .................. 371/14, 16, 15, 20, 371/12, 68, 60, 61, 7, 15.1, 16.1, 22.6, 68.1, 68.3, 22.1; 364/200 MS File, 900 MS File

[56] References Cited

U.S. PATENT DOCUMENTS

| | | | |
|---|---|---|---|
| 3,581,075 | 5/1971 | Mattsson | 371/14 |
| 3,593,307 | 7/1971 | Gouge | 371/14 X |
| 4,317,200 | 2/1982 | Wakatsuki et al. | 371/25 |
| 4,464,751 | 8/1984 | Stranko et al. | 371/29 |
| 4,553,204 | 11/1985 | Hashimoto | 371/12 X |
| 4,587,654 | 5/1986 | Matsumoto et al. | 371/14 |
| 4,616,335 | 10/1986 | Howe, Jr. et al. | 364/900 |
| 4,679,195 | 7/1987 | Dewey | 371/29 |

OTHER PUBLICATIONS

Abstract of Japanese Patent Control System for Error Detection JP 55-32157 and JP 55-32156.

*Primary Examiner*—Joseph Ruggiero
*Assistant Examiner*—Robert W. Beausoliel
*Attorney, Agent, or Firm*—Baker, Maxham, Jester & Meador

[57] ABSTRACT

This apparatus stops the clock for a processor partition consisting of a group of processor units in response to detection and classification of an error in a processor unit which can cause a cascade of errors in the partition group.

14 Claims, 10 Drawing Sheets

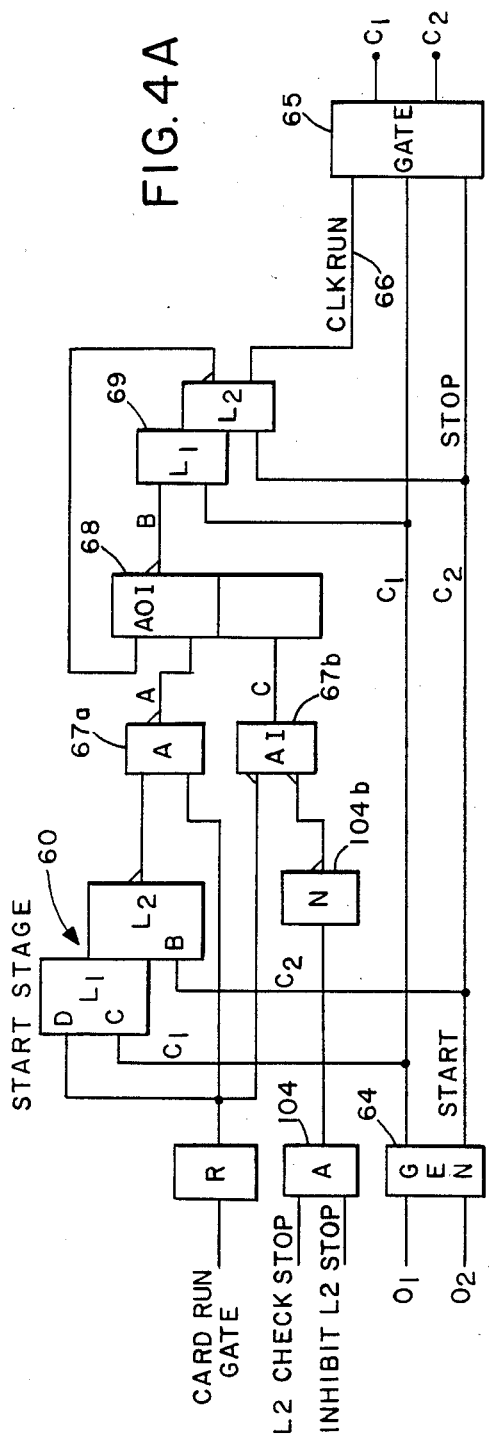
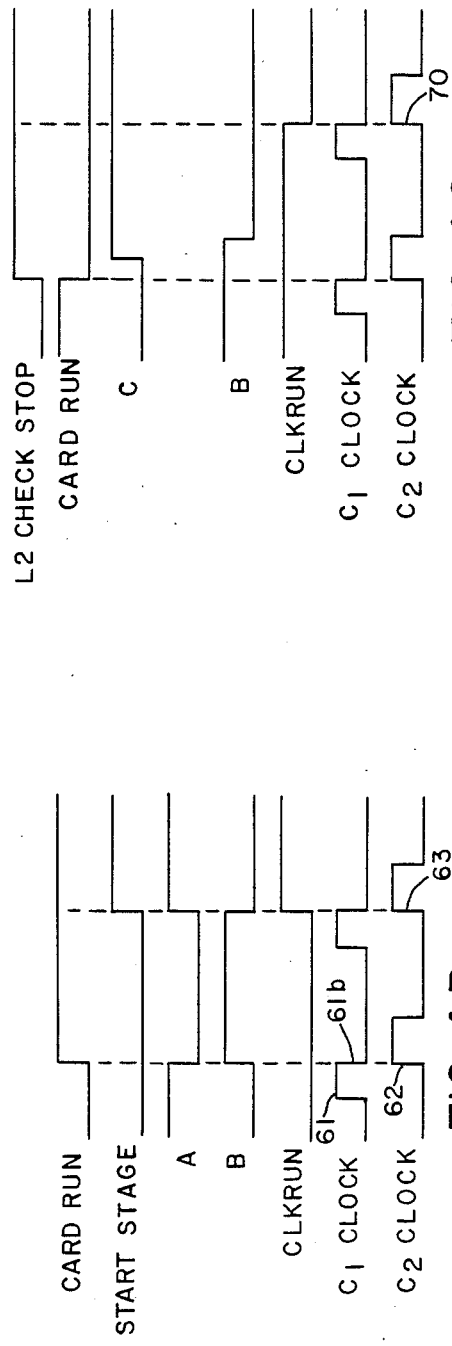
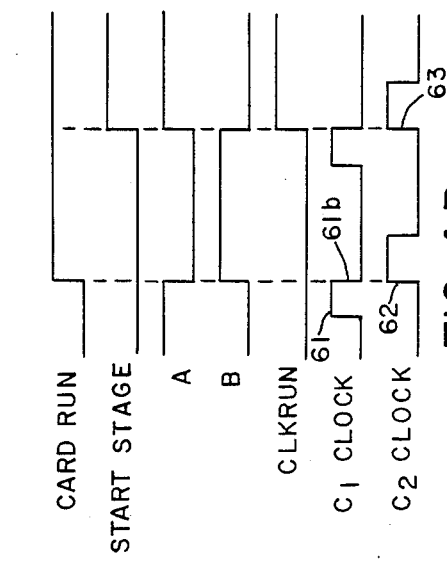
FIG. 4A
FIG. 4B
FIG. 4C

APPARATUS FOR PARTITIONED CLOCK STOPPING IN RESPONSE TO CLASSIFIED PROCESSOR ERRORS

CROSS REFERENCE TO RELATED PATENT APPLICATION

This application is related to co-pending U.S. patent application Ser. No. 07/211,584 filed June 27, 1988, entitled "SIMULTANEOUS TRANS-PROCESSOR BROADCAST OF MACHINE CONDITIONS IN A LOOSELY-COUPLED MULTI-PROCESSOR SYSTEM", and assigned to the Assignee of this application.

BACKGROUND OF THE INVENTION

This invention relates to devices and methods for stopping a processor system clock in response to errors detected in processor system units. More particularly, the invention concerns the selective stopping of the clocks of a processor partition consisting of a group of units, the integrity of whose operations can be affected by an error occurring in one of the units.

In the prior art, processors having a modular construction represented by FIG. 1, include a backplane board 10 which carries connector mechanisms (not shown) into which are inserted logic cards 12-1 through 12-n. The logic cards are interconnected by backplane wiring on the backplane board 10.

Functional layout of the circuit boards of FIG. 1 is indicated by reference numerals 12-1 and 12-2 of FIG. 2 which correspond to the identically-numbered boards of FIG. 1, and which are representative, generally of the remaining boards in FIG. 1. The circuit boards of FIG. 2 include unit modules, $M_1$, $M_2$, and $M_3$ on circuit board 12-1, and modules $M_1'$, $M_2'$, and $M_3'$ on the board 12-2. The modules on the board 12-1 are not necessarily equivalent in function to those on the board 12-2; for example 12-1 may have its modules arranged and connected to form a scalar processing configuration, while those of the board 12-2 may be arranged to form a vector processor. The modules on the boards 12-1 and 12-2 are operable only when provided with clock signals from clock generators (CG) 14-1 AND 14-2 respectively. Each clock generator derives a local clock from a system oscillator signal produced by the clock oscillator 25 and distributed on signal lines 25-1 and 25-2. The generated clock signals are provided on signal lines 16-1 and 16-2, respectively. Without provision of clock signals, the modules are inoperable. For detecting module operation errors, error indicators 18-1 and 18-2 are connected to the modules of the boards 12-1 and 12-2, respectively. The error indicators 18-1 and 18-2 are conventional in all respects, and are used to collect and forward error indications from their respective connected modules. The indicators 18-1 and 18-2 each respond to error indications from their respective connected modules by providing two error signals, one to indicate the presence of an error (IND) on signals lines 20-1 and 20-2, respectively, and the other a STOP signal on signal lines 22-1 and 22-2 to a gate circuit corresponding to the NOR gate 23. Any time an error indication is received from one of the board modules, its associated error indicator raises its STOP signal, which deactivates the output of the NOR gate. The NOR gate output corresponds to the CLOCK GATE signal which is provided to each of the clock generators 14-1 and 14-2. The deactivated CLOCK GATE signal prevents the clock generators from generating and forwarding clock signals to their associated modules. Removal of clock signals from the modules prevents them from operating while a support processor 20 executes an error checking and correcting process in response to the error indication signal received on line 20-1 or 20-2. Assuming successful completion of the error correction process, the support processor will reset the STOP and IND signals, causing the CLOCK GATE to activate. Resultantly, the clock generators 14-1 and 14-2 are once again enabled to provide clock signals to operate the modules.

The clock stopping apparatus and procedure of FIG. 2 is implemented for all of the cards in the processor of FIG. 1. Thus, whenever an error is detected on one of the cards, the clocks on all of the cards are seized up until the error correcting procedure of the support processor 20 is completed. It will be appreciated that, while an error occurring in the functional operation of one card may propagate to, or cause errors in, other cards, it is not always of necessity true that such an error will propagate to all of the other cards. Significant portions of the processor may remain operable even while other portions are functioning erroneously. Further, an error in the operation of one card may affect as few as one other card. For example, an error in a vector processor execution may affect the operation only of an associated scalar processor. However, failure of a memory card may affect a great number of other cards which conduct processes requiring access to the memory card.

A conditioned response to the detection of error in a processor with the modular construction of FIG. 1 would support the continued, although degraded, operation of the processor in the face of detection of error in one of its cards. An appropriate response would permit the interruption of operation only of an error-producing unit, as well as other units whose operations are affected by this unit, without interrupting the operations of other, unaffected units.

SUMMARY OF THE INVENTION

The apparatus of this invention provides conditioned clock-stopping in response to detection of erroneous operation in a unit by stopping the clock for that unit, as well as stopping the clocks for units in a partition consisting of a group of units whose operations are likely to be affected by operation of the erroneous unit. The clocks to units not within the partition are not interrupted, permitting those units to continue operations while error analysis and correction procedures are undertaken with reference to the stopped units.

Recognizing that an error in one unit may have little or no effect on the operation of other units, the invention also supports localized clock intervention which stops the clock only in the unit experiencing the error.

Finally, the practice of the invention recognizes that there are areas of a processor in which an error can occur that will have little effect on the remainder of the system, and which can be recovered from without any interruption to operation at all.

The principal advantage of this invention is the provision of a conditioned response to the occurrence of error condition during machine operations which permits clock intervention directed to a partition of the processor when an error is detected requiring multiple units to be stopped.

Another advantage of the invention is the timely interruption in the operation of the single unit in response to an error which will not affect the remaining processor units.

A distinct advantage of this invention when partitioned intervention is undertaken is the synchronization of clock stopping for all of the units in the affected partition.

Finally, when single-unit clock stopping is necessary, a benefit of the invention is found in rapidly suspending the clock for that unit.

Further scope of applicability of this invention will be evident when the detailed description given below is read with reference to the below-described drawings. It will, however, be manifest that the detailed description and specific examples given below, while indicating a preferred embodiment of the invention, serve only to illustrate it, since various elaborations, changes, and modifications within the spirit and scope of the invention will be evident to the skilled artisan.

BRIEF DESCRIPTION OF THE DRAWINGS

FIG. 4A illustrates details of a gated clock generator shown in FIG. 3.

FIGS. 4B and 4C are waveform drawings showing, respectively, how the clock generator of FIG. 4A starts and stops.

DETAILED DESCRIPTION OF THE INVENTION

Descriptions relating to an apparatus for processor error checking are found in U.S. Pat. No. 4,464,751, assigned to International Business Machines Corporation. The contents of this patent are incorporated by reference into this specification.

Figure 1:
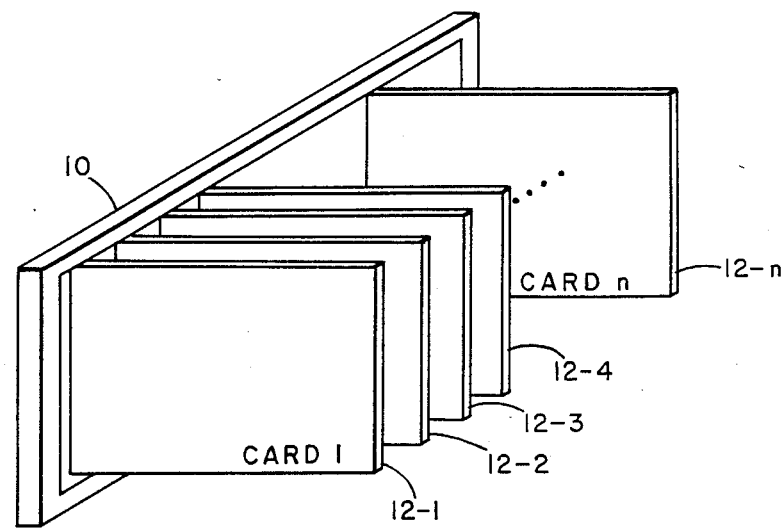
FIG. 1 shows, in schematic form, a data processor having a modular construction.

In the description to follow, the term "unit" is interchangeable with the term "card", both referring to a modular element exemplified by any one of the cards 12-1 through 12-n of FIG. 1. Further, units or cards in this description are assumed to comprise complements of modules interconnected to cooperatively perform a unit function. Further, it is assumed that the modules on a unit or a card are operable when provided clock signals, and that their operations can be interrupted by interruption of these clock signals. Each unit is further assumed to include an error detector and indicator apparatus providing a plurality of error signals which can manifest certain module error conditions on a unit.

In the invention, a first class of error is defined as a "level one error", (L1). A level-one error is an error class in response to which a multiple-unit partition is to be stopped concurrently. This error level classification is useful for errors occurring in areas of a processor where plurality of cards within a subsystem must be stopped together in order to maintain synchronicity between them for restart purposes. For example, in processors which utilize a pipelined structure a need exists for multiple unit stopping, since a number of instructions may be in the process of execution at a given point in time. Freezing the pipeline is vital to analysis of, and recovery from, error.

A second classification of errors is defined as "level two", (L2). This type of error causes only the detecting unit to stop, and to stop as soon as is possible. This error level classification is useful in areas of a processor which, if stopped, do not interfere with or contaminate processes executing in remaining parts of the machine, even if those processes enter a quiescent, or suspended, state. This error level classification is useful in processing system units which conduct serial processes, but which rely heavily on the synchronism provided by a clock signal across module boundaries. Preferably, all modules of the unit are interrupted in synchronism in response to a level two error, which enhances the prospect of recovery, since the state of the unit will closely conform to that existing at the time of error occurrence. In the description following, L1 and L2 errors are not naturally exclusive. Preferably, a unit generating an error can have its operation interrupted on an L2 basis while L1 interruption operations are proceeding.

Finally, "level three" errors (L3) are those types of errors which require no clock intervention anywhere in the processor. It is assumed that correction of these errors is handled by hardware, functional microcode, or support processor error correction/recovery code. Any required clock stopping in response to this level of error is left to the correcting process.

Figure 3:
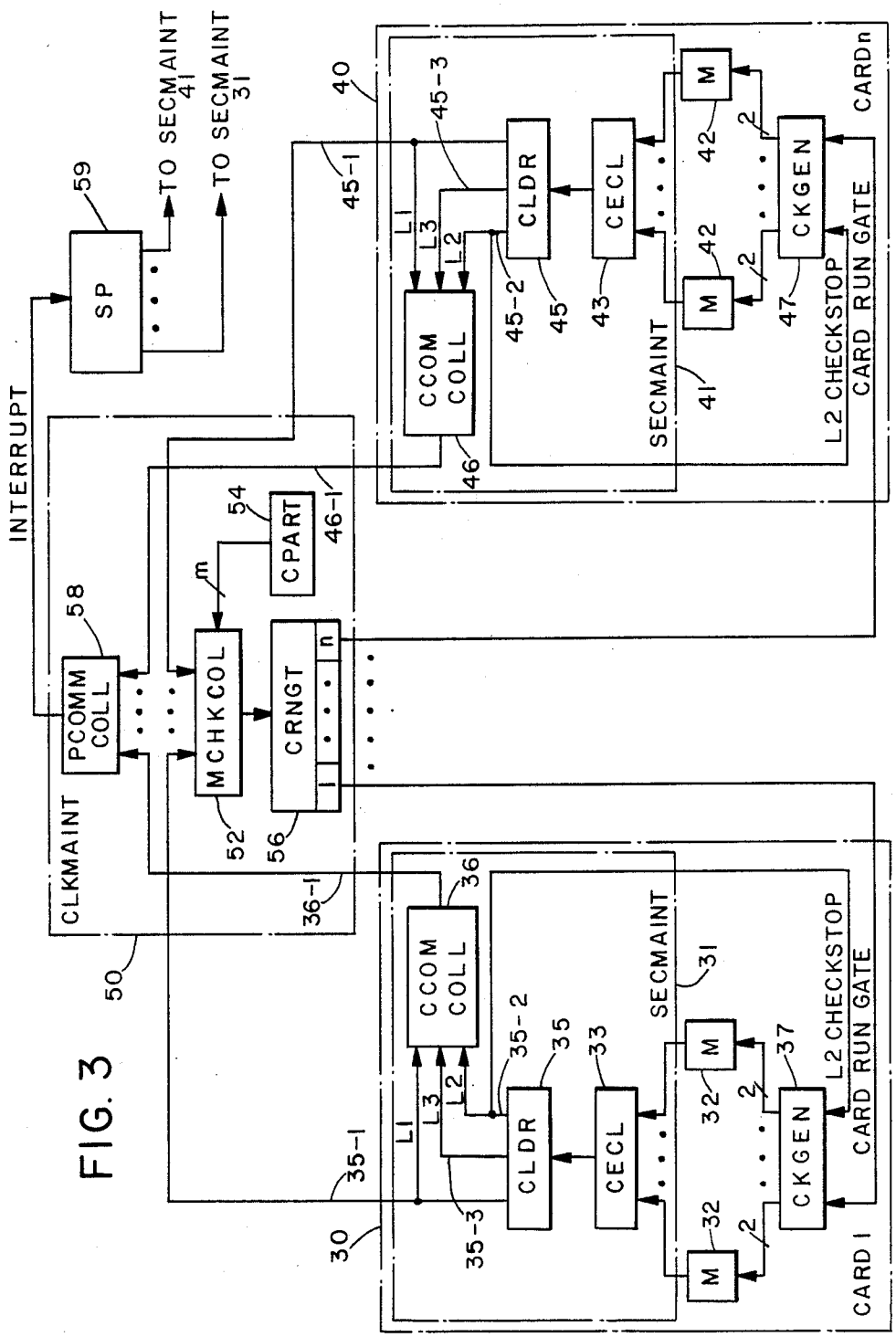
FIG. 3 is an overall block diagram of the preferred embodiment of the invention.

FIG. 3 illustrates, at a high level of abstraction, the invention. The invention includes a plurality of identical, unit-level elements, each located on a respective card of a modularized processor, such as that illustrated in FIG. 1. All of the unit-level elements are connected to a primary-level element which monitors error indications and initiates appropriate, partitioned clock stopping according to the invention.

In FIG. 3, two cards 30 and 40 carry identical unit-level secondary clock maintenance ("SECMAINT") apparatus 31 and 41. It is intended that the units 31 and 41 represent a plurality of two or more of such unit-level SECMAINT apparatus. In the card 30, a plurality of modules 32 have error signal lines connected to a card error check collection (CECL) element 33, which collects and forwards error indication signals from the modules to a card-level detection and recording (CLDR) circuit 35. Based upon receipt of an error indication from the collector 33, the CLDR circuit 35 classifies the error as being level one (L1), level two (L2) or level three (L3), and outputs corresponding signals on signal lines 35-1 through 35-3. All of these signals are provided to a card error communications collector (CCOM COLL) 36 which forwards on circuit line 36-1 the level classification signals L1, L2 and L3 received from the circuit 35. In addition, the L1 signal is fed forward, while the L2 level classification signal is fed, on line 35-2 back to a gated clock generator (CKGEN) 37. The clock generator 37 operates in response to a CARD RUN GATE signal by providing a pair of clock signals (described in detail below) to each of the card modules. The clock generator 37 responds to the provision of an L2 level classification signal (L2 CHECK-STOP) by ceasing to provide clock signals to the modules. Thus, detection of an L2 level classification signal by the SECMAINT unit 31 on the card 30 will result in a suspension of the clock signals provided to the modules on the card 30.

Inspection of FIG. 3 will reveal that the SECMAINT circuit 41 for the card 40 is identical to that just described for the card 30. Thus, the card 40 has an error classification capability which enables it to classify errors indicated by the modules 42 on the card 40 by producing L1, L2 and L3 signals. In addition, the operations of the modules 42 on the card 40 are interrupted by interruption of clock signals provided to the modules when the L2 signal is generated.

Considering the primary clock maintenance (CLKMAINT) element 50 in FIG. 3, all of the L1 signals output by card-level SECMAINT units are collected and monitored by a machine check collection (MCHKCOL) element 52 to which is connected a card partition (CPART) circuit 54. The card partition circuit 54 provides a plurality of partition signals. Each of the partition signals provided by the card partition circuit 54 corresponds to, and indicates, a partition consisting of a group of one or more units whose operations are to be synchronously interrupted in response to an L1 signal from any unit of the partition. Based upon receipt of an L1 signal from a respective one of the processor cards, the machine check collection circuit 52 selects the partition signal representing the group of cards whose operations are to be synchronously interrupted in response to the particular L1 signal received.

A card run gate (CRNGT) circuit 56 is connected to receive the output of the machine check collection circuit 52. When the apparatus of FIG. 3 is initialized, the card run gate circuit 56 is conditioned to continuously assert a plurality of CARD RUN GATE signals. Each of two CARD RUNGATE signals is provided to a respective one of the cards 30 and 40. When a partition signal is selected by the machine check collection circuit 52, it is forwarded to the CARD RUN GATE circuit 56, which conditions the CARD RUN GATE signals provided to the cards represented by the partition signal to a state which interrupts the operations of the clock generators on those cards. This preserves the process state represented by the condition of the cards included in the group represented by the selected partition signal.

Error signal reporting is provided by way of the primary communications collection circuit (PCOMM COLL) 58, which collects the output of the card error communications collection circuits, and forwards them in the form of an INTERRUPT signal, which is used to initialize an error checking maintenance procedure in a support processor 59 which performs processor initialization routines, and which conducts error analysis and correction procedures in response to an INTERRUPT signal received from the CLKMAINT circuit.

Referring now to FIGS. 4A-4C, important details necessary to the understanding of the specific embodiment of the invention will be laid out. FIG. 4A illustrates a gated clock generator such as the generators 37 and 47 of FIG. 3. The gated clock generator of FIG. 4A is understood to be representative of each corresponding element in the units of the processor wherein the invention is practiced. Preferably the gated clock generator, and the specific circuitry hereinafter described, is based upon level sensitive scan design (LSSD) circuitry. In this regard, the basic circuit unit is a shift register latch (SRL) containing two latching elements, referred to as L1 and L2, respectively. One such SRL is indicated by reference numeral 60 in FIG. 4A. Ports D and C are used for the data and clock inputs to the SRL. The L2 portion has its data input port connected internally to the L1 output and uses the B input port to clock it. In a latch-trigger design, the B input is also used for the trigger clock, which provides the main timing sequence of this invention. Each SRL is fed a clock signal consisting of two clock waveforms $C_1$ and $C_2$, illustrated in FIG. 4B. Data presented to the D input of the L1 latch and enters the latch while the $C_1$ clock waveform has positive level 61. Such data is retained in the latch at negative edge 61b of C1. This data is available from the output of the L2 latch at the rising edge 62 of the C2 clock.

The fundamental operational cycle ("the machine cycle") of the processor in which the invention operates is defined by the period between successive positive transitions of the C2 clock. It is assumed for the purposes of understanding this invention that the unit modules operate in response to the provision of C1 and C2 clocks.

Figure 2:
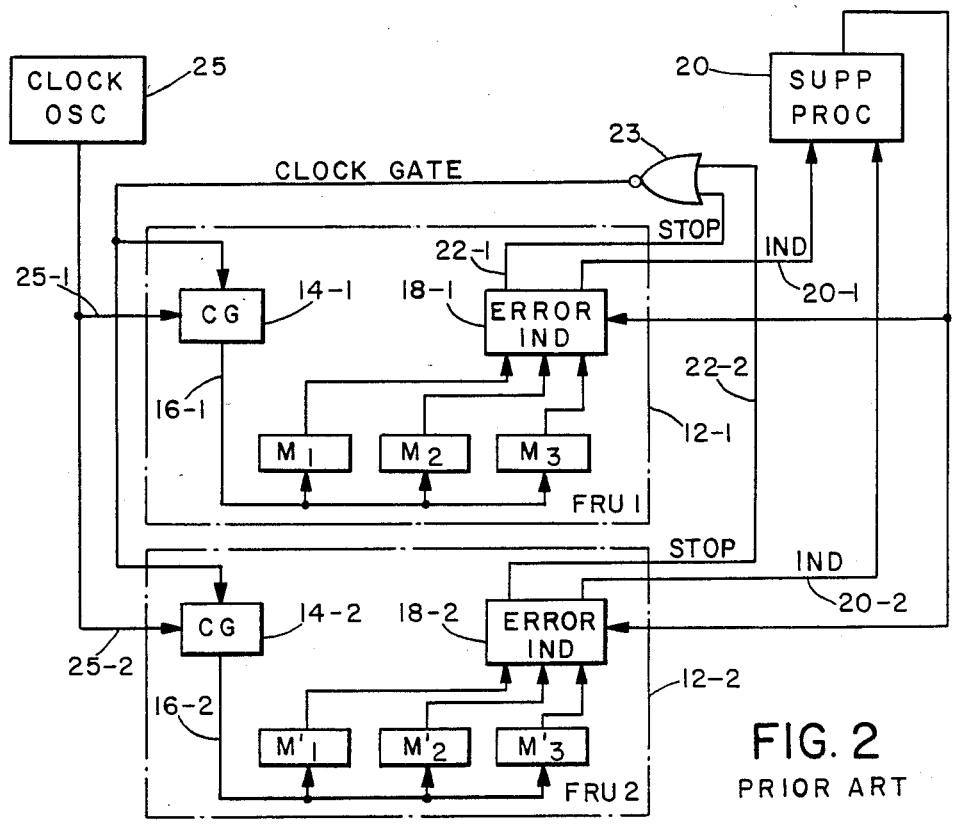
FIG. 2 shows, in block diagram form, a portion of a typical prior art clock intervention apparatus for a modular processor such as is illustrated in FIG. 1.

Turning now to the description of the gated clock generator illustrated in FIG. 4A and used in the unit-level elements of this invention, a clock waveform generator 64 develops the C1, C2 waveforms from a pair of oscillator waveforms 01 and 02, respectively. The oscillator waveforms represent the primary and delayed outputs, respectively, of a system clock oscillator, such as the oscillator 25 of FIG. 2. The clock waveforms C1 and C2 are fed to a clock gate 65 which provides the clocks to the unit's modules when a gate signal on line 66 has a positive state. The gate signal on the signal line is initially set high by provision of a CARD RUN GATE signal to the unit on which the gated clock generator is located. When the CARD RUN GATE signal rises (FIG. 4B) it is latched and inverted by the SRL 60 and fed, together with its positive form to the inverting AND gate 67a. As shown by the A waveform in FIG. 4B, the output of the AND gate 67a assumes a negative level until the output of the SRL 60 rises at edge 63 of the C2 clock. The negative-level pulse in the A waveform causes the output of the inverting AND-OR (AOI) gate 68 to assume a positive level until the SRL 69 rises at the C2 transition 63. After the C2 transition 63, the output of the SRL 60 remains high, as represented in the CLKRUN signal of FIG. 4B. It is the CLKRUN signal which is provided on signal line 66 to pass the C1 and C2 waveforms through the gate 65.

For so long as the CARD RUN GATE signal remains in a positive state and the L2 CHECK STOP signal provided by the unit on which the gated clock generator of FIG. 4A is located remains low, the output of the inverting-input AND gate 67b will remain negative, as illustrated by waveform C in FIG. 4C. When the CARD RUN GATE signal drops, or when the L2 CHECK STOP signal rises, the C waveform rises, causing a transition to a negative level at the output of the AOI gate 68. This is shown by waveform B in FIG. 4C. The negative transition of the output of the gate 68 will be reflected by transition to a negative level in the output of the SRL 69 one cycle after the level of waveform B drops. This is illustrated in FIG. 4C where the CLKRUN waveform exhibits a negative-going transition in synchronism with transition 70 in the C2 clock waveform.

Thus, in response to an appropriate transition in either the CARD RUN GATE or the L2 CHECK STOP signal for a unit, the unit's modules will be deprived of the clock signals necessary for them to operate. This will result in "freezing" the operational configuration of the modules, and the state of the unit, at the time the clocks are suspended.

Figure 5A:
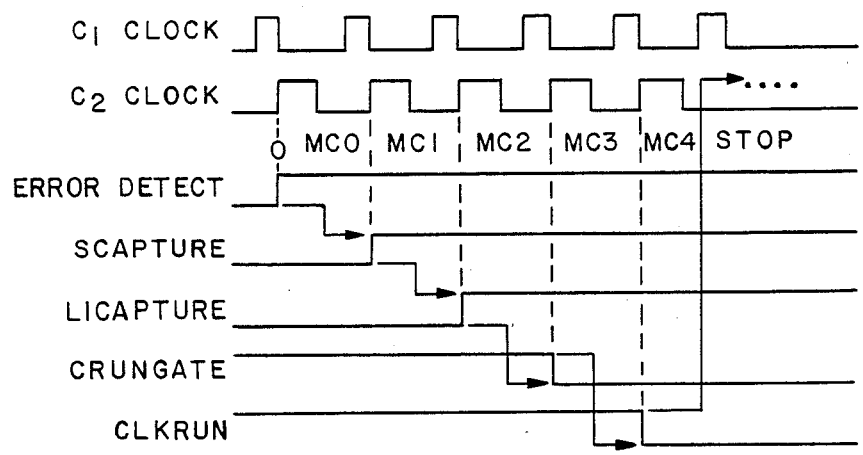
FIGS. 5A and 5B are waveform diagrams which show, respectively, operational sequences of FIG. 3 in synchronous partitioned clock stopping and quick single-unit clock stopping.

In the invention, an L1 level classification signal will result in the suspension of the clock for one or more units, based upon partitioning. An L1 classification signal requires stopping the clocks in a plurality of cards. Thus, upon detecting and classifying an error the logic path between a SECMAINT unit and the CLKMAINT unit must be traversed twice. In this event, four (4) machine cycles are permitted to occur before the appropriate card clocks are stopped. The timing of this operation is shown in FIG. 5A. In FIG. 5A, an error is detected during machine cycle 0 (MC0), causing a signal SCAPTURE to rise at the beginning of machine cycle 1. In response to positive transition of SCAPTURE, the error is classified and a signal LICAPTURE rises at the beginning of cycle 2. In response to LICAPTURE rising, the CARD RUN GATE signals (CRUNGATE) for the members of the selected partition all fall at the beginning of cycle 3, resulting in fall of the associated CLKRUN signals at the beginning of cycle 4.

Figure 5B:
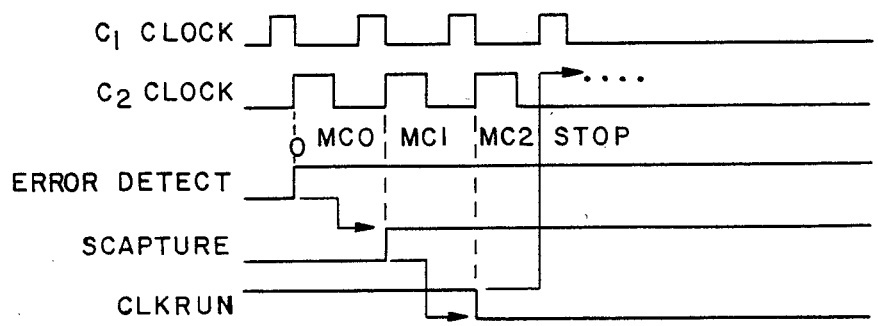

An L2 CHECK STOP signal indicates that the unit detecting the error must stop quickly. The unit's SECMAINT classifies this error and performs the clock control so as to stop the clocks in response to this error after two (2) machine cycles have passed. The timing for this is illustrated in FIG. 5B, wherein the error is detected during machine cycle 0, and the signal SCAPTURE rises at the beginning of the machine cycle 1, which, after classification, results in the negative transition of the CLKRUN signal at the beginning of cycle 2.

Figure 6:
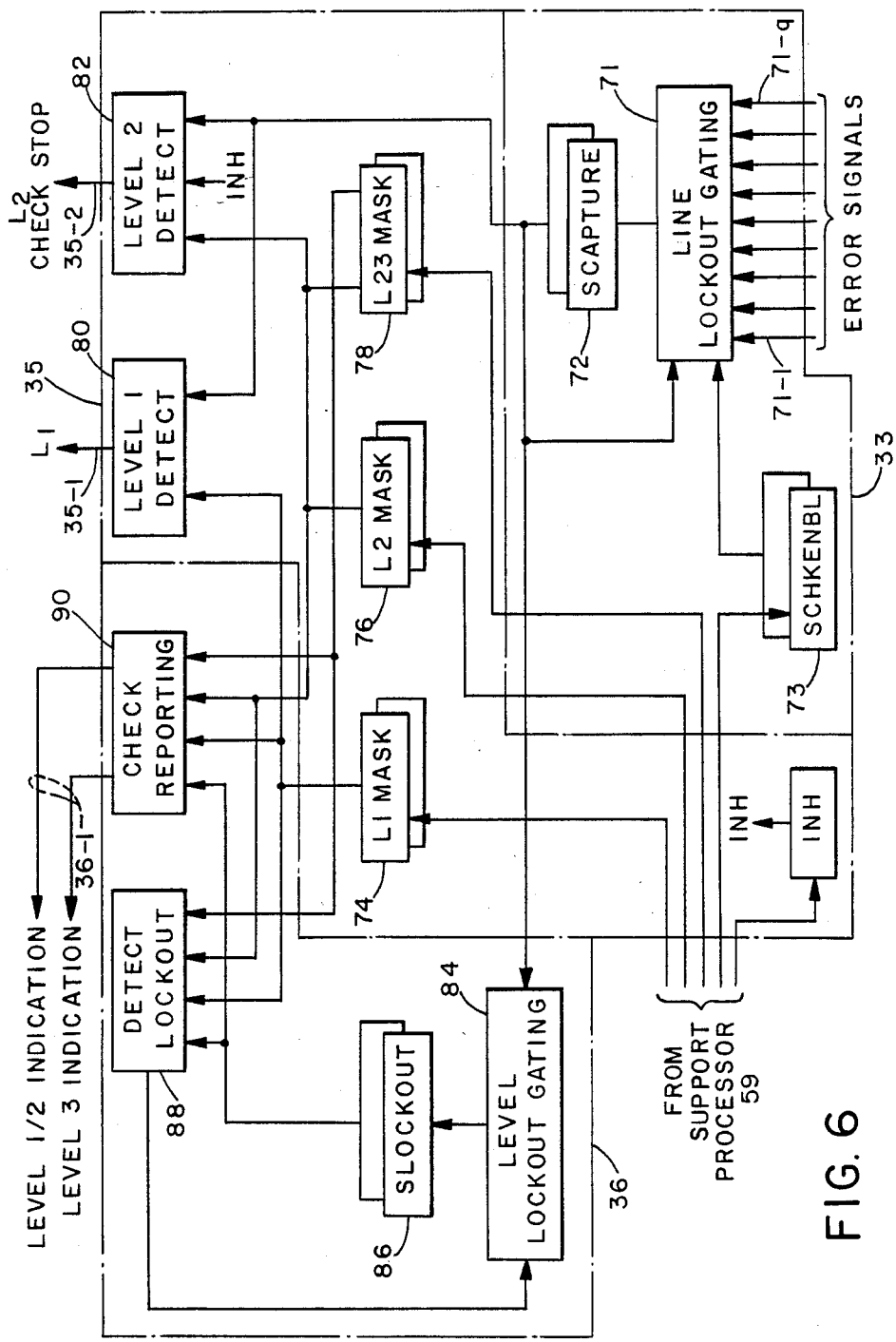
FIG. 6 is a block diagram illustrating, in greater detail, critical blocks of FIG. 3.

Referring now to FIG. 6, the card error check collection circuit 33 and card level detection and reporting circuit 35 in the SECMAINT element 31 of FIG. 3 are shown in more detail. All error signals generated on the card 30 are fed through a line lockout gate circuit 71 to a capture register (SCAPTURE) 72. Each of the signal lines 71-1 through 71-n is connected to one of n module error indicators in the unit being served by the SECMAINT unit. The line lockout gate 71 acts to provide a clear path for each of the error signal lines 71-1 through 71-n into the SCAPTURE register 72. Entry of the first error indication in the SCAPTURE register 72 on any one of the error signal lines 71-1 through 71-n is fed back to the line lockout gate 71 to prevent another error signal being entered into the register on that error signal line. A masking pattern stored in a secondary check enable (SCHKENBL) register 73, is used to mask error indications through the line lockout gate circuit 71. The mask is in a conventional digital format and operates such that a "1" in a respective bit position in the register 73 will enable the line lockout gate 71 to receive an error indication on a corresponding error indication line. A "0" in that mask position will prevent the line lockout gate 71 from responding to an error indication on the corresponding error indication line. Each of the machine error indication lines 71-1 through 71-q is monitored by a respective one of the bit positions of the SCAPTURE register 72, which captures and holds the first active indication that an error has occurred. This is done on a per error line basis, and allows other error indications that occur to be captured while the first error is being classified.

Each bit in the SCAPTURE register 72 has an associated bit in two of three mask registers, the associated bits indicating into which levels the particular error is to be classified. These registers are labelled L1 MASK 74, L2 MASK 76, and L23 MASK 78. The SCAPTURE register 72, in the preferred embodiment, is 36 bits wide, while the L1 MASK, L2 MASK and L23 MASK registers 74, 76, and 78 are 24, 24, and 12 bits wide, respectively.

The bit pattern stored in the L1 MASK register 74 comprises a conventional digital mask; that is, a "1" in a particular bit position of the mask classifies an error signal in this bit position in the SCAPTURE register 72 as a level 1 error, while a "0" indicates that the error is not to be classified in level 1. In the preferred embodiment, the L1 MASK register 74 applies to the most significant 24 bits of the SCAPTURE register 72. A mask in the L2 MASK register 76 also masks the most significant 24 bit positions in the SCAPTURE register 72 in the same manner as the L1 MASK in the L1 MASK register 74. This permits error indications captured in the SCAPTURE register 72 to initiate both level one and level two clock stopping, when necessary. This might be necessary when, for example, an error correction strategy calls for a serial processor and associated vector processor to stop synchronously and rapidly.

The L23 MASK of the L23 MASK register 78 operates on the least significant 12 bits of the SCAPTURE register 72 and classifies these bits as either level two or level three by the convention that a "1" indicates a level two error while a "0" indicates a level three error. The result is that only the least significant 12 bits of the SCAPTURE register 72 may be used for level three indications, while all 36 bits are permitted to classify associated errors as level 2.

The outputs of the SCAPTURE register 72 and the L1 MASK register 74 are connected to a level one detection circuit (LEVEL 1 DETECT) 80, which compares the registers contents on a bit-by-bit basis to determine whether any error signals in the SCAPTURE register 72 are to be classified as level one errors according to the L1 MASK in the L1 MASK register 74. If a bit in the most significant 24 bit positions of the SCAPTURE register 72 has been set by receipt of an error signal, and that bit is matched by a set bit in the corresponding bit position of the L1 MASK 74, the level one detection circuit 80 will output an L1 signal. Similarly, the outputs of the SCAPTURE register 72, the L2 MASK register 76, and the L23 MASK register 78 are all connected to a level two detection circuit 82 (LEVEL 2 DETECT). Any time an error indication in the SCAPTURE register 72 is masked by a corresponding L2 indication in a corresponding bit position in one of the registers 76 or 78, the circuit 82 outputs an L2 CHECK STOP signal.

As discussed above, SCAPTURE register bits which have their respective mask bits set in the L1 MASK register 74 will raise the unit's L1 signal, which is forwarded, on signal line 35-1 to the machine check collection circuit 52 in the CLKMAINT unit 50 (FIG. 3). As described below, these SCAPTURE bits also cooperate with corresponding inhibiting signals (INH) from an INHIBIT register 83 to inhibit any subsequent level two stop indications from being recognized by the level two detection circuit 82, since it would be possible to stop the unit out of synchronization with other units in the partition if an error indication was classified as a level two level in the cycle following the L1 classification.

Those bits of the SCAPTURE register 72 that are masked for level two are sent to the unit's gated clock generator to stop the unit, on the condition that the level two inhibiting function is not active. The possibility of asynchronous stopping between units is intrinsic with level two errors, so no blocking of clock stopping functions is done at this level. The detection of a subsequent level one check in the two cycles before the clocks are stopped in response to a level two error will initiate a partitioned clock stopping even though this level one error may have resulted from the level two error condition. This is done to prevent the error being dispersed through other units.

The SCAPTURE register 72 allows each error indication to be captured and held, but provides no information as to the sequence of error occurrence. The secondary lockout (SLOCKOUT) register 86, in combination with level lockout gating circuit 84 and a DETECT LOCKOUT circuit 88, performs this function by monitoring the outputs of the SCAPTURE register 72 for the presence of error conditions in much the same fashion as the SCAPTURE register 72 does with error signals. However, instead of locking each bit position as an error indication occurs as in the line lockout circuit, all positions within group levels are blocked in the SLOCKOUT register 86 after detection of the first error in any position. In this regard, the outputs of the SCAPTURE register 72 are fed through the level lockout gating circuit 84 to the SLOCKOUT register 86. In turn, the outputs of the SLOCKOUT register 86 are fed to the detect lockout circuit 88, which also receives the outputs of the L1 MASK register 74, the L2 MASK register 76, and the L23 MASK register 78. When the first clock stop error (classified as L1 or L2) is entered into the SCAPTURE register 72, the error is provided through the level lockout gating 84 to the input of the SLOCKOUT register 86. The error indication bit is compared in the DETECT LOCKOUT circuit 88 with all of the masks in the mask registers 74, 76 and 78. If the error indication occupies a bit position masked by a bit in the L1 or L2 masks, the DETECT LOCKOUT circuit 88 provides a lockout signal to the level lockout gating 84, preventing it from providing any more error signals masked by bits in the L1 or L2 masks. Similarly, the first error indication entered in the SCAPTURE register 72 which is classified as an L3 error enters the SLOCKOUT register 86, and the detect lockout circuit 88 provides an L3 lock to prevent any more L3-classified error indications from entering the SLOCKOUT register 86. Thus, the SLOCKOUT register 86 will capture the first error indication classified as a L1 or L2 error, as well as the first non-clock check stop (L3 error). This permits error detection and recovery procedures to narrow down the investigation into the reason for an error occurrence. Finally, the card error communications collection function is performed by the check reporting circuit 90 which operates in a manner essentially equivalent to the lockout detection circuit 88 to provide an indication of a clock-stopping L1 or L2 error and an L3 error.

Figure 7:
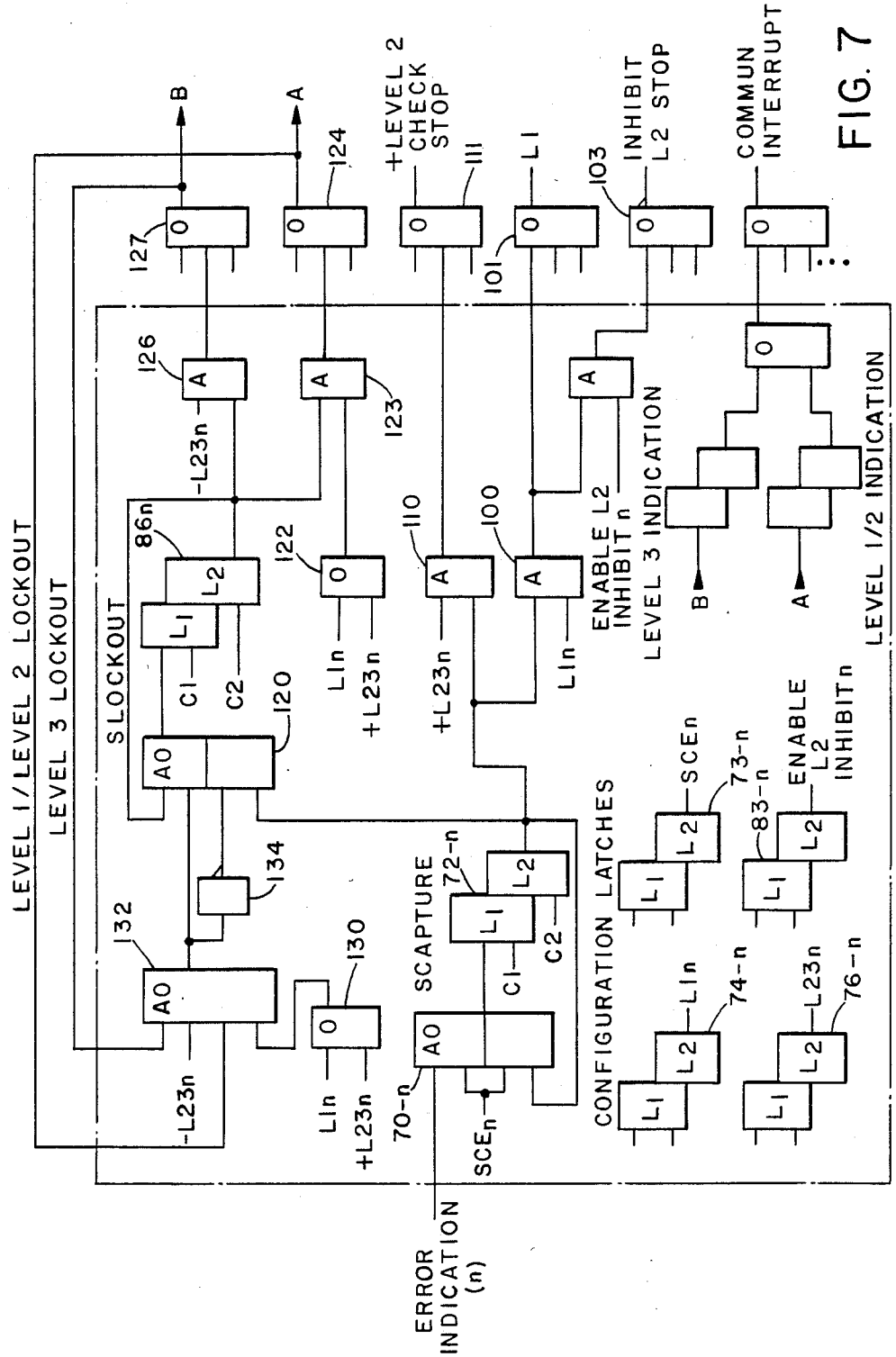
FIG. 7 illustrates a circuit-specific implementation of the circuit portion illustrated in FIG. 6.

A circuit-specific implementation of the SECMAINT apparatus of FIG. 6 is illustrated in detail in FIG. 7 for one error indication bit. It is asserted that the logic of FIG. 7 is conventionally replicated in parallel to provide, for example, a 36-bit wide capability in the preferred embodiment. Once again, the circuit technology of FIG. 7 utilizes SRL-based logic. Thus, all registers are composed of arrays of parallel SRL's. In FIG. 7, the nth cells of the SCAPTURE, SCHKENBL, L1 MASK, and L2 MASK registers are indicated by 72-n, 73-n, 74-n, and 76-n, respectively, while the nth bit of the SLOCKOUT register is indicated by 86-n. Gates designated in FIG. 7 as AO are well known AND-OR gates in which two parallel, multi-input AND gates have their outputs connected as the only two inputs to an associated OR gate.

Assume now, that error indication bit n rises, signifying an error indication signal being provided by the error indicating unit connected to error input line n. Assume further that L1 MASK bit n is set, as is the nth bit of the SCHKENBL register. In this case, the output of the upper AND gate of AO gate 70 will rise, causing the output of the AO circuit 70 to rise. The level rise will be available on the positive output of cell 72-n of the SCAPTURE register 72. The positive output will be fed back to the AND gate of AO gate 70, preventing any successive error clocked into cell 72-n. In addition, the positive output of the SCAPTURE cell 72-n is fed to a gate combination including AND gate 100 and 24-way OR gate 101. The AND/OR combination 100 and 101 represents the level one detection circuit 80, with the OR gate 101 collecting the outputs of 23 other AND gates in addition to AND gate 100. If the L1 MASK bit corresponding to the nth bit of the SCAPTURE register is set, the AND gate 100 will be activated when the output of SCAPTURE cell 72-n rises. This essentially classifies the nth error indication as a level one error, which is forwarded by way of the OR gate 101 as an L1 signal. Similarly, if the bit in the L2 MASK corresponding to the nth cell of the SCAPTURE register is set, the output of the AND gate 110 will rise, causing the output of the 36-way NOR(N) gate 111 to fall, thereby providing the level two check stop signal in the proper polarity for interrupting the provision of clock signals. The NOR gate 111, the AND gate 110 and 35 other AND gates comprise the level two detect circuit 82 of FIG. 6.

The level lockout gate in circuit 84 is represented by the AO gate 120 whose output is connected to the input of the nth cell of the SLOCKOUT register 86. When an error signal is asserted on the nth error indication line, causing the output of SCAPTURE cell 72-n to rise, the output of the AO gate 120 rises. The rising output is clocked through SLOCKOUT cell 86-n. The output of this cell is fed back through the AO gate 120, which "locks" the cell from responding to any further changes in the output of SCAPTURE cell 72-n. The error indication locked into SLOCKOUT cell 86-n is classified as a level one/level two lockout through the combination of OR gate 122, AND gate 123, and 24-way OR gate 124. Similarly, the AND gate 126 and 12-way OR gate 127 classify the lockout as a level three lockout if the corresponding bit of the L23 MASK is a "0", which, when provided in inverted form to the AND gate 126, appears positive. Lockout detection of the bit in SLOCKOUT cell 86-n is provided by OR gate 130, AO gate 132 and inverter 134.

The communications interrupt (COMMUN INTERRUPT) signal is developed by ORing the LEVEL 1/LEVEL 2 LOCKOUT and LEVEL 3 LOCKOUT signals available at the outputs of gates 124 and 127, respectively. These signals are provided to the OR gate 136 after registration through SRL's 138 and 139, respectively. The output of OR gate 136 is collected at the input side of a 32-input OR gate 137. The output of the OR gate 137 is the COMMUN INTERRUPT signal; this signal is intended to provide asynchronous notification of a machine error occurrence in the processor. Such notification, for example, is provided to the support processor to initiate error diagnosis and recovery.

The INH register 83 of FIGS. 3 and 6 stores an inhibit mask equal in length to the L1 mask, and operating on the same bits in the SCAPTURE register. Whenever one of the inhibit mask bits is set, the clock generator for the affected unit will not respond to an L2 CHECK STOP generated for a corresponding SCAPTURE register bit. For a detailed understanding, refer to FIGS. 4A and 7. Assume inhibit mask bit n is set, indicated by a positive level value for the output of INH register output 83-$n$ (ENABLE L2 INHIBIT n). The output of the AND gate 102 will rise when SCAPTURE bit 72-$n$ is set. This will deactivate the output of NOR gate 103 (INHIBIT L2 STOP), which, since the L2 CHECK STOP and INHIBIT L2 STOP signals are fed to the AND gate 104 in the clock generator (FIG. 4A) the INHIBIT L2 STOP signal will prevent the output (B) of the AO gate 68 from falling. This will limit the clock generator to respond only to the CARD RUN GATE signal for suspending provision of $C_1$ and $C_2$.

Inspection of FIG. 7 in combination with FIG. 4A will confirm that a level two clock stop is accomplished in two cycles. At the beginning of the first cycle, an error indication is presented to the SRL comprising the SCAPTURE cell 72-$n$. At the beginning of the second cycle, the error indication in SCAPTURE cell 72-$n$ is classified as an L2 error by propagation through gates 110 and 111, enters the clock control mechanism through gates 104, 67$b$, 68 and is presented to the input of the SRL 69. At the beginning of the third cycle, the signal has caused the CLKRUN signal to fall on signal line 66, thereby interrupting the clocks.

Figure 8:
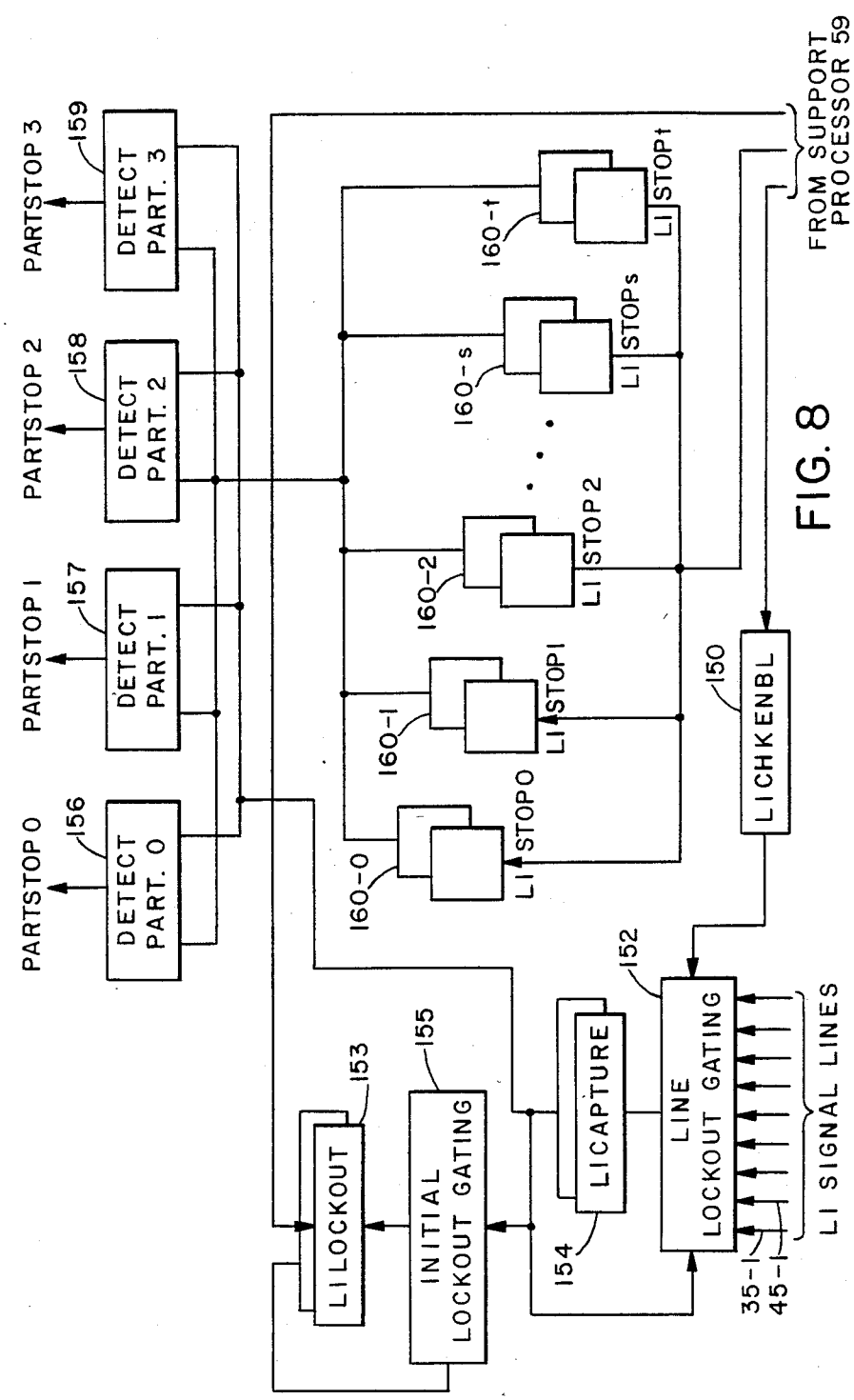
FIGS. 8 and 9 illustrate in greater detail critical blocks of FIG. 3.
Figure 9:
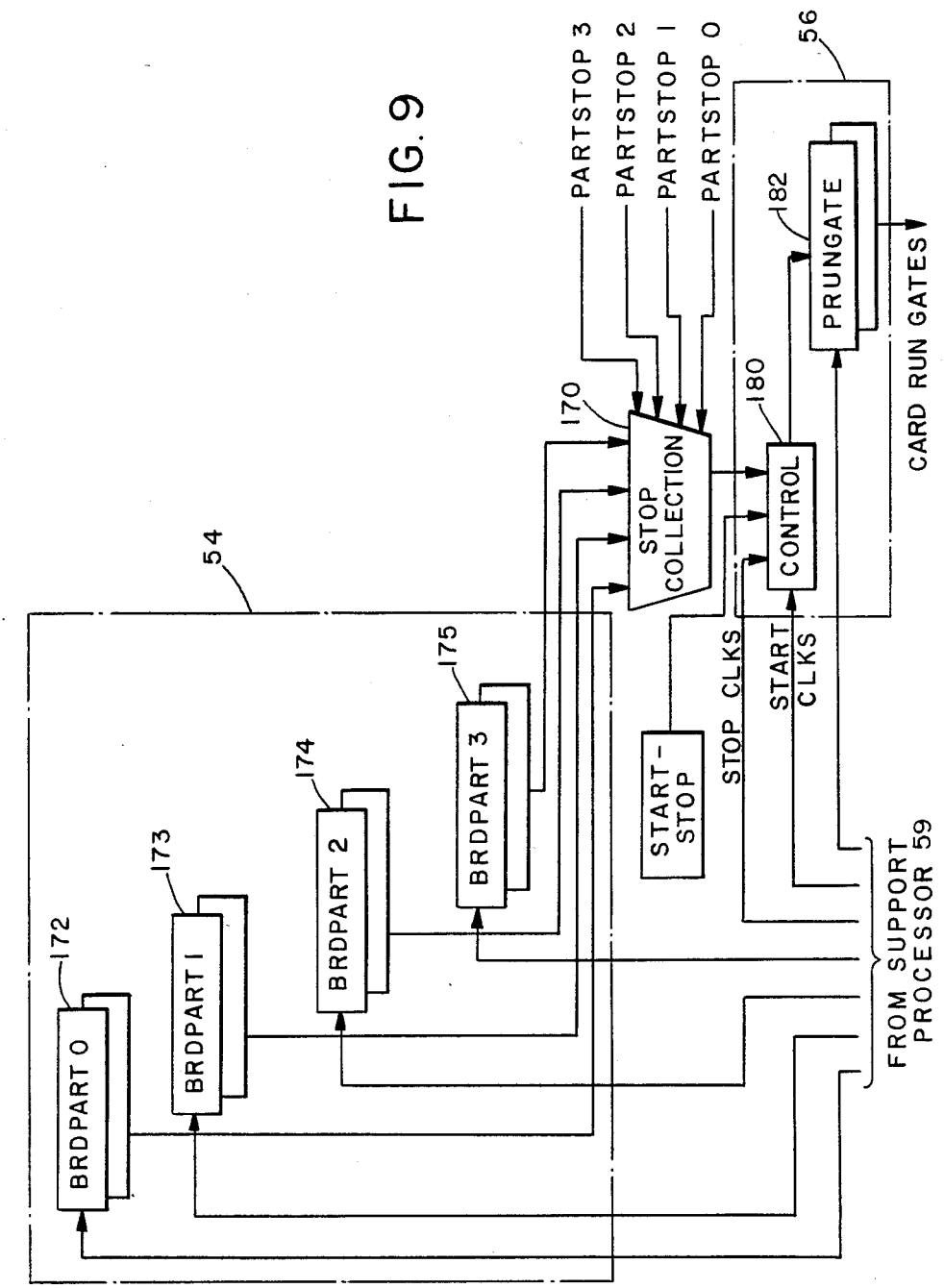

The CLKMAINT mechanism is shown in detail in FIGS. 8 and 9. In FIG. 8, the outputs of all of the level one detection circuits in the processor units are collected on input lines. Thus, for example, the signal lines 35-1 and 45-1 are shown. According to the L1CHKENBL MASK in the register 150, those L1 signals with a corresponding MASK bit pass through the gating circuit 152 to an L1CAPTURE register 154. The L1CAPTURE register 154 operates in the same manner as the SCAPTURE register described above. That is, it captures any L1 signal arriving on an L1 signal line from a unit, so long as that L1 signal line is enabled by the mask. A lockout loop consisting of a lockout gating circuit 155 and a L1 lockout register 153 captures the first L1 signal entering the L1 capture register 154 on any L1 signal line and then ignores any later arriving L1 signals on that line. The L1CAPTURE register is a t bit register, in which each bit position corresponds to a respective one of a maximum of t SECMAINT circuits.

The output of the L1CAPTURE register 154 is provided to each of four partition detection circuits 156-159. The partition detection circuits also receive at their inputs the output of a primary check stop circuit consisting of SRL pairs 160-0 through 160-$t$. Each partition detection circuit is for generating a signal identifying one of four predetermined partitions. Each SRL pair is preset with a two-bit code corresponding to one of the four predetermined partitions. Since each SRL provides both a positive and inverted output, each SRL pair of the primary check stop circuit indicates one state of a four-state code. Each primary check stop SRL pair is associated in each partitioned detection circuit with a corresponding bit in the L1 capture register 154. Thus, the output of bit position 0 of the L1 capture register 154 is associated in each of the partition detection circuits 156-159 with primary check stop SRL pair 160-0, and so on. Continuing the example, if a level one error signal is registered into bit position 0 of the L1CAPTURE register 154 from the SECMAINT circuit connected to the input of bit position 0, it will be passed to the input of the partition detection circuit enabled by the code in SRL pair 160-0. The outputs of the partition detection circuits 156-159 provide board partition stop signals, PARTSTOP 0-3. Each PARTSTOP signal indicates that the clocks for each unit of a respective partition are to be interrupted. The partition detection circuit outputs are fed to a stop collection multiplexer 170, which is illustrated in FIG. 9. In FIG. 9, four board partition (BRDPART) registers 172-175 are connected to the inputs of the multiplexer 170. Each of the registers 172-175 has a partition mask in it in which each bit position corresponds to a respective unit. A mask defines a partition as a group of units whose clocks are to be interrupted in synchronism and in response to an L1 error signal from any member of the partition. The mask comprises a conventional 1-dimensional bit array with 1's entered into the bit position corresponding to partition members, and 0's into every other position. It should be obvious that the bit positions containing 0's are all of the remaining units of the processor which are not included in the partition.

The output of the stop collection multiplexer 170 is inverted and fed to a primary run gate (PRUNGATE) register 182 through a control circuit 180. When an L1 error occurs, a PARTSTOP signal is activated, causing the multiplexer 170 to select the output of the corresponding BRDPART register, the output being passed through the control circuit 180 and entered into the PRUNGATE register 182. The selected mask in the PRUNGATE register defines the CARD RUN GATE signals provided to the unit gated clock generators. When a partition mask is selected and entered into the PRUNGATE register 182, the CARD RUN GATE signal for each unit in the partition will be deactivated by the 0 in the unit's bit position, thereby synchronizing the interruption of the units in the partition.

Figure 10:
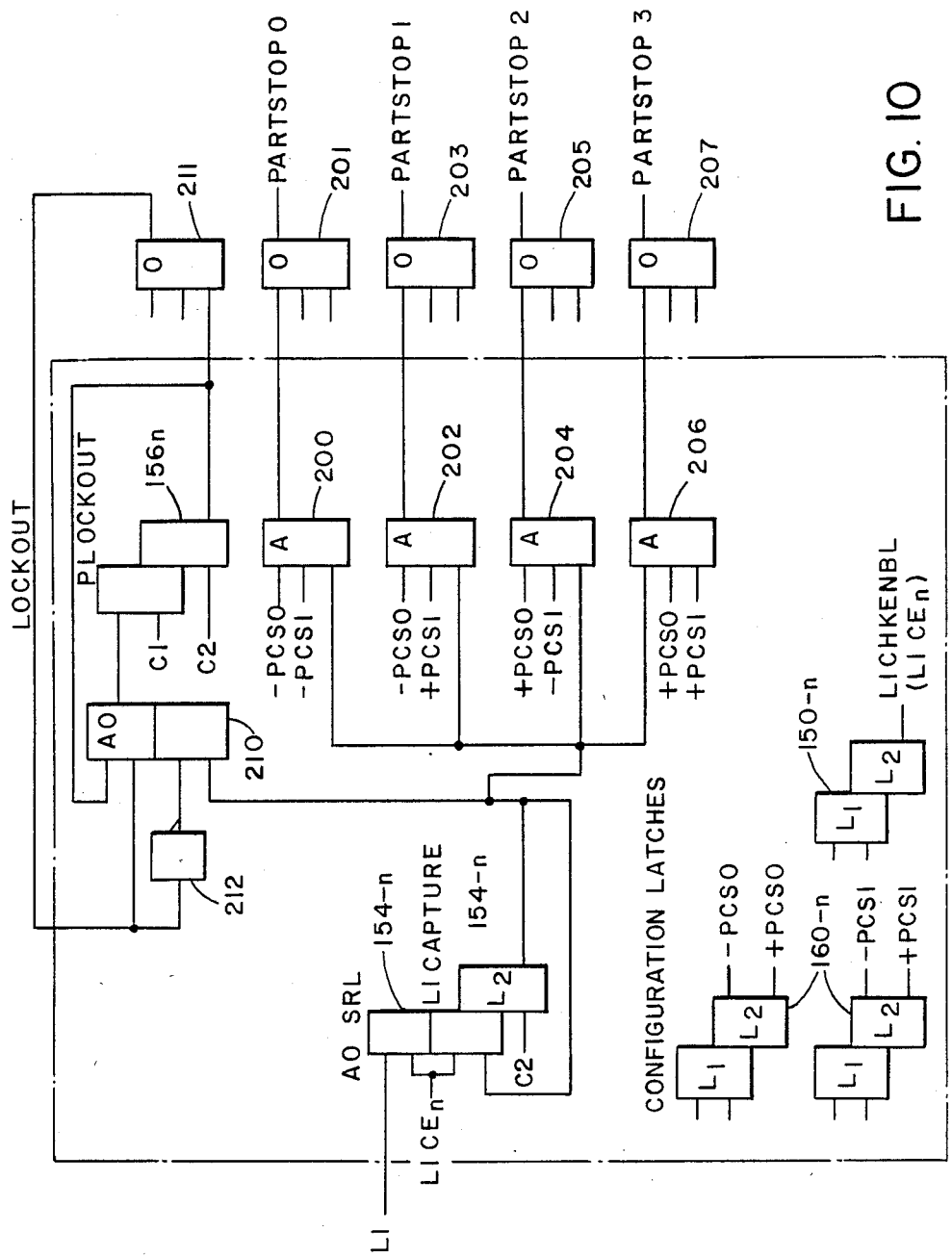
FIGS. 10 and 11 illustrate circuit-specific implementations of FIGS. 8 and 9, respectively.
Figure 11:
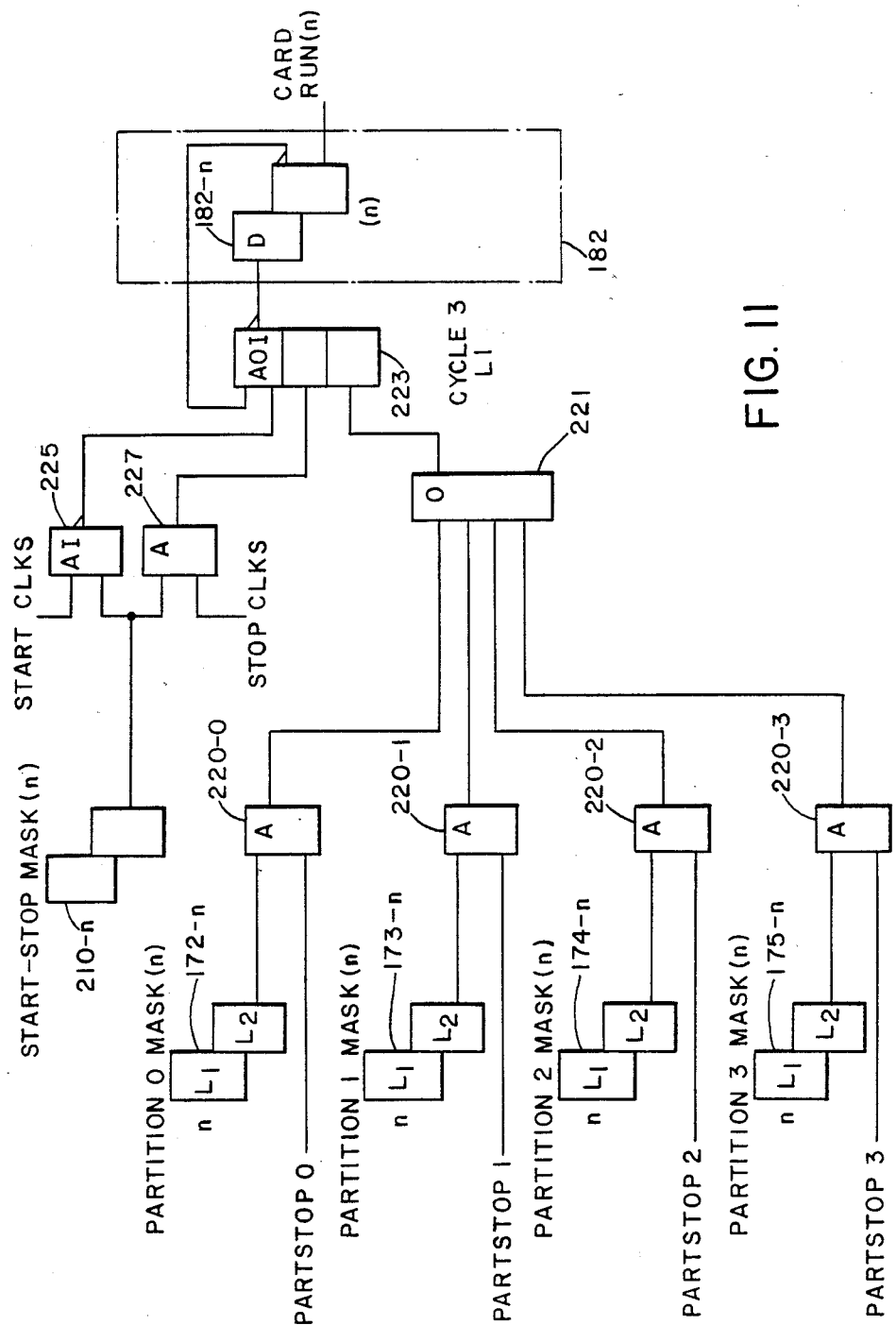

FIGS. 10 and 11 illustrate the SRL circuit implementation of the CLKMAINT apparatus of FIGS. 8 and 9. FIGS. 10 and 11 represent a single-bit slice of the layout illustrated in FIGS. 8 and 9, it being understood that the CLKMAINT apparatus comprises an integrated plurality of these slices operating cooperatively. In FIG. 10, a level one error signal is received from unit n and latched into L1CAPTURE cell 154-$n$. The input to the cell 154-$n$ includes an AND/OR gate which is controlled by bit 150-$n$ from the L1CHKENBL register 150. The integrated AO gate locks L1CAPTURE cell 154-$n$ when the first L1 signal is latched into it. The output of L1CAPTURE cell 154-$n$ is fed to the input of four partition detection circuits, each consisting of an AND (A) gate feeding an OR (O) gate. Each of the partition stop AND gates 200, 202, 204 and 206 receives also a respective combination of the outputs of check stop SRL pair 160-$n$. Thus, according to the state of the check stop pair SRL 160-n, the L1 error signal in L1CAPTURE cell 154-n will be fed forward from an AND gate to one of the OR gate 201, 203, 205 or 207 to form a partition stop signal.

Lockout of the first L1 signal entered into the L1CAPTURE register is implemented in the loop consisting of AND/OR gate 210, L1 lockout register cell 156-n, OR gate 211, and inverter 212. This loop operates to capture the first L1 error signal entered into the register 154, locking out all subsequent L1 errors and thereby identifying the first of a string of such errors.

In FIG. 11, the stop collection multiplexer consist of an array of AND gates 220-0 through 220-3, each receiving a respective PARTSTOP signal, as well as bit n from the board partition mask registers 172-175. An OR gate 221 collects the outputs of the AND gates 220-0 through 220-3, and forwards the partition mask bit selected by the AND gate array to a control circuit AND/OR-invert gate 223. The AOI gate 223 controls the input to SRL pair 182-n of the PRUNGATE register 182, and thus controls the state of the nth CARD RUN GATE signal. Also feeding the AOI gate 223 are a START CLKS signal through an inverting AND gate 225 and a STOP CLKS signal through an AND gate 227. The gates 225 and 227 receive the nth bit of the start-stop mask register 210 (FIG. 9). To initialize operation of the apparatus of this invention, the START CLKS signal is raised, causing the START-STOP MASK bit n to be entered into the nth bit of the PRUNGATE register 182. Once initially configured, the CARD RUN GATE signal provided by the PRUNGATE register 182 will continue to be asserted, until changed when an L1 error signal selects a partition mask, which is entered into the PRUNGATE register to determine the state of the CARD RUN GATE signals thereafter.

Inspection of FIGS. 7, 10, 11 and 4A will confirm that clock interruption in response to a L1 error is indeed completed in four machine cycles. An error indication is presented to SCAPTURE cell 72n during machine cycle 0 and is available from the output of the SRL at the beginning of the machine cycle 1. The error is classified as a level one error by gates 100 and 101, and is entered into L1 capture cell 154n. The L1 signal is available from L1 capture cell 154n at the end of cycle two. The captured level one error signal selects a partition group by propagation through one of the partition detection AND/OR combinations, and selects a partition mask through one of the stop collection AND gates. The selected partition mask is presented to the PRUNGATE register 182 and is latched during cycle 3. Finally, the CARD RUN GATE signal resulting from latching of the partition mask into the PRUNGATE register 182 causes a change in the CLKRUN signal output from the SRL 69 at the end of cycle 4. Thus, with detection of the level one error in cycle 0, all units in the partition selected by the level one signal are interrupted simultaneously at the end of cycle 4.

Referring now to FIGS. 3, 6, 8 and 9, assume the occurrence of a level 2 error in the unit denoted by reference numeral 30. In this regard, one of the modules 32 raises an error indication on one of the error lines 71-1 through 71-q which is gated into the SCAPTURE register 72 through the lockout gate 71. Assuming the error is the first occurring since initialization, it will be entered into the lockout register 86 at a bit position dedicated to the module which originated it. At the same time, the error will be output by the SCAPTURE register at a corresponding bit position and classified by the detection circuits in response to the L1, L2, and L23 masks. Once classified, the L2 CHECK STOP signal is raised, resulting in suspension of the unit clocks. The check reporting circuit 90 raises a level 1/level 2 lockout signal at the output of the OR gate 127 (FIG. 7), which is forwarded to the primary communications collector 58. The primary communications collector 58 operates conventionally to generate an INTERRUPT signal forwarded to the support processor 59. In response to the INTERRUPT signal, the support processor scans the SECMAINT and CLKCNTL lockout in capture registers to initiate appropriate diagnostic and corrective action.

Assuming that the error indication in the just-related example is classified as a level 1 error, the L1 signal would be output by the SECMAINT unit on signal line 35-1, on which it will be transferred to the CLKMAINT unit. There, the L1 signal is gated through the lockout gating 152 into a bit position in the L1CAPTURE register 154 (and a corresponding bit position in the L1LOCKOUT register 153) as originating from the unit 30. In the CLKMAINT unit, the L1 signal is compared against the four-state code in the primary check stop SRL pair 160-0 to determine which one of four partitions the unit 30 is a part of. The appropriate PARTSTOP signal is provided from one of the four partition detection circuits 157-159, and selects one of the four board partition masks in the registers 172-175. The mask is entered into the PRUNGATE register 182, with the result that the card run gate signals for all units in the partition are deactivated, thereby simultaneously and synchronously suspending the operations of the selected partition.

Continuing the example of L1 partitioned clock stopping, the clock signals in the unit where the L1 error originated might already have been stopped if the error is also classified as an L2 error, and if the mask in the units inhibit register does not prevent the suspension of clocks in response to the L2 check stop signal. In this case, the clocks in the unit whereat the error indication originated have been interrupted two machine cycles before the other units in the affected partition.

Maximum flexibility in practicing the invention is provided through the programmability of all SECMAINT units and the CLKMAINT unit. In this regard, and with particular reference to FIGS. 6, 8 and 9, there are illustrated programming inputs from the support processor 59. The support processor is preferably a conventional programmed device, which can comprise, for example, a personal computer PS/2, operating to initialize and to maintain a processor incorporating this invention. The support processor is intended to support initialization of the processor and to respond to error conditions arising within the processor. The support processor is conventionally programmed to respond to an interruption resulting from a machine error (also, "machine check") by implementing a diagnostic procedure to isolate and correct malfunctions in the processor. In order to assist such diagnosis, the invention operates to respond initially to a machine check condition in the form of the above-described error indications by "freezing" portions of the machine (the processor) and their operational configurations at the time the error occurred.

Rapid maintenance access into the malfunctioning processor can be provided to the support processor 59 by an address map which embraces the check enable registers, mask registers, and primary check stop SRL latch pairs. Since these elements of the invention can be included in the addressable resource array of the support processor, they can be programmed directly by the support processor. Advantageously, this would enable the support processor to program the L1MASK, L2MASK, L23MASK, and the check enable mask in the SCHKENBL register 73 (FIG. 6). Additionally, a direct connection between the support processor and the inhibit register of the SECMAINT unit (FIG. 6) would allow the L2 inhibition pattern to be programmed by the support processor.

In the CLKMAINT unit (FIGS. 8 and 9), connection to the support processor 59 gives the ability to establish unit partitions by programming the partition mask registers 172–175. Further, each processor unit is assigned to a partition through the programming of the primary check stop SRL pairs. Thus, for example, the processor unit serviced by the SECMAINT unit 35 is linked to a partition by the four-state code programmed into SRL pair 160-0.

The support processor also is used to set the initial CLOCK RUN gate pattern in the PRUNGATE register 182, provides the start and stop signals to the control block 180 (FIG. 9) and programs the start-stop mask into the start-stop register of the CLKCNTL unit.

The support processor 300 is also linked to receive error reporting information from all of the SECMAINT units and from the CLKMAINT unit by direct access to the information entered into the lockout registers 86 and 156, and into the capture registers 72 and 154. The reading of information from the invention can be implemented in the support processor either on the basis of response to an interruption generated conventionally in reaction to an error indication of any level. Alternatively, the support processor 59 can be programmed to repeatedly scan the capture and lockout registers of the invention.

We claim:

1. In a processing system including a plurality of connected units, each of said units for performing a system function and including a plurality of modules connected in an operable configuration for execution of said system function in response to a unit clock signal, each of said units further including error determining means connected to the modules of said unit for developing a plurality of error signals, each of said error signals indicative of an error in a respective one of the modules of each of said units, an improvement for partitioned clock stopping, wherein said improvement comprises:
    a plurality of error classification means, each of said error classification means in a respective one of said units and connected to the error determining means in said respective one of said units to receive error signals generated by said error determining means for classifying said error signals according to a predetermined scheme and for generating first and second level classification signals indicative of a first and second error class, respectively;
    a plurality of clock run signal generators, each of said clock run signal generators in a respective one of said units for producing a unit clock signal in response to a unit run gate signal, said each of said clock run signal generators including means connected to the error classification means in said respective one of said units and responsive to a second level classification signal from said error classification means for preventing the clock run signal generators from producing a unit clock signal;
    a partition means for generating a plurality of unit partition signals, each partition signal representing a group of units, wherein each group includes at least one of said units; and
    a run gate generator connected to said plurality of clock run signal generators for producing a plurality of unit run gate signals, each unit run gate signal being provided to a respective one of said plurality of clock run signal generators, said run gate generator including first means connected to said partition means and to said plurality of error classification means for selecting a first partition signal in response to a first level classification signal generated by an error classification means and second means connected to said first means for cancelling the unit run gate signals produced by said run gate generator for the clock run signal generators in the group of units corresponding to said first partition signal.

2. The improvement of claim 1 further including a plurality of communication collection means, each in a respective one of said units for classifying the first error signal generated for said unit, each of said communications collection means including means for identifying the module in said unit causing said first error signal.

3. The improvement of claim 1 further including a line lockout means connected to said plurality of error classification means for identifying a first unit as the source of the first of a plurality of first level classification signals.

4. The improvement of claim 1 further including programmable means connected to a first error classification means for selectively producing error classification indication signals and logic means in said first error classification means for combining said error classification indication signals with error signals to generate said first and second level classification signals.

5. In a processing system including a plurality of connected units, each of said units including clock-responsive modules connected to perform a processing function, and each of said units including error determining means connected to the modules of said unit for developing a plurality of machine error signals, an improvement for partitioned clock stopping, wherein the improvement comprises:
    an error classification means in a first unit, connected to the error determining means of said first unit, for classifying error signals developed by said error determining means, said error classification means indicating error signal classification by generating first and second level classification signals representing, respectively, of a first and second error class;
    a first clock signal generator in said first unit responsive to a first run gate signal for producing first clock signals to operate the modules of said first unit;
    means in said first clock signal generator connected to said error classification means for preventing said first clock signal generator from producing said first clock signals in response to said second level classification signal;
    a second clock signal generator in a second unit for producing second clock signals to operate the modules of said second unit in response to a second run gate signal;

a run gate generator connected to said first and second clock signal generators for producing said first and second run gate signals;

a partition means for generating a plurality of partition signals, each of said partition signals defining a group of units, wherein each group includes at least one of said units, one of said partition signals defining a group including said second unit; and selection means connected to said partition means and to said error classification means for selecting said one of said partition signals in response to said first level classification signal, said selection means including means connected to said run gate generator for preventing said run gate generator from producing said second run gate signal in response to said selection of said one of said partition signals.

6. The improvement of claim 5 further including lockout means in said first unit, said lockout means connected to said error classification means for identifying a source of the first of a plurality of error signals.

7. The improvement of claim 5 further including lockout means for identifying said first unit as the source of the first of a plurality of first level classification signals.

8. In a processing system including a support processor means for remote support programming and a plurality of connected processing units connected to said support processor means, each of said processing units including a plurality of modules connected to perform a processing function in response to clock signals, and each of said processing units including error determining means connected to the modules of said each of said processing units for developing machine error signals, an improvement for selective clock stopping, the improvement comprising:

a programmable error classification apparatus in a first processing unit and connected to the error determining means of said first processing unit for selectively classifying the error signals produced by said error determining means, said error classification apparatus including a programmable means connected to said support processor means for generating first and second level classification signals in response to said error signals and to programmed classification signals received by said programmable means from said support processor means;

a first clock signal generator in said first unit for producing first clock signals to operate the modules of said first unit in response to a first run gate signal;

means in said first clock signal generator connected to said error classification means for preventing said first clock signal generator from producing said first clock signals in response to said second level classification signal;

a second clock signal generator in a second unit for producing second clock signals to operate the modules of said second unit in response to a second run gate signal;

a run gate generator connected to said first and second clock signal generators for producing said first and second run gate signals;

a programmable partition means connected to said support means for storing programmed partition information received by said programmable partition means from said support processor means, said partition information including a partition signal defining a group of processing units including said second processing unit; and clock control means connected to said programmable partition means and to said error classification means for combining said partition signal and said first level classification signal to produce a run gate generator control signal which prevents said run gate control generator from producing said second run gate signal.

9. In a processing system including a plurality of connected units, each of said units for performing a system function and including a plurality of clock-driven modules connected to perform said system function in response to a clock signal, each of said units further including error determining means connected to the modules of said unit for developing a plurality of machine error signals, each of said error signals indicative of an error in a respective one of the modules of said unit, and each of said units further including clock means responsive to a clock run signal for generating unit clock signals for operating the modules of said unit, a method for partitioned stopping of unit clock signals, said method including the steps of:

grouping the units of said processing system into a plurality of partitions, a first partition including a first unit;

at a second unit, receiving and classifying error signals, a first error signal being classified as a first level error requiring interruption of the operations of units in said first partition; and in response to said first level error, and to said grouping, interrupting the unit clock signal of said first unit.

10. The method of claim 9 wherein said grouping step includes grouping said units of said processor such that said first partition includes said second unit, and further including the step of:

in response to said first level error and to said grouping, interrupting the unit clock signal of said second unit simultaneously with interrupting the unit clock of said first unit.

11. The method of claim 9, wherein said grouping step includes grouping said units of said processor such that said first partition includes said second unit, and further including the step of:

at said second unit also classifying said first error signal as a second level error requiring interruption of the operations of said second unit; and at said second unit, interrupting the unit clock signal of said second unit in response to said second level error.

12. The method of claim 11 wherein said unit clock signal of said second unit is interrupted prior to the interruption of said clock signal of said first unit.

13. The method of claim 9 further including programmably providing error classifying signals at said second unit, said error classifying signals identifying modules of said second unit with said first level error and comparing said error classifying signals with said first error signal to classify said first error signal.

14. The method of claim 9 further including programmably providing partitioning signals, each partitioning signal representing the grouping of units into a predetermined partition, and wherein said interrupting step includes selecting a respective partition signal with said first error signal and interrupting the unit clock signals of the grouping of units represented by said respective partition signal.

* * * * *

UNITED STATES PATENT AND TRADEMARK OFFICE
CERTIFICATE OF CORRECTION

PATENT NO. : 4,916,697

DATED : April 10, 1990

INVENTOR(S) : Roche et al

It is certified that error appears in the above-identified patent and that said Letters Patent is hereby corrected as shown below:

Please delete "of" from Claim 5 at Column 16, line 56.

Signed and Sealed this

First Day of October, 1991

Attest:

HARRY F. MANBECK, JR.

*Attesting Officer*     *Commissioner of Patents and Trademarks*